US006501369B1

United States Patent
Treharne

(10) Patent No.: US 6,501,369 B1
(45) Date of Patent: Dec. 31, 2002

(54) VEHICLE SECURITY SYSTEM HAVING UNLIMITED KEY PROGRAMMING

(75) Inventor: William David Treharne, Livonia, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/546,776

(22) Filed: Apr. 11, 2000

(51) Int. Cl.$^7$ ................................................ G05B 19/00
(52) U.S. Cl. .................... 340/5.22; 340/426; 455/151.1; 307/10.5; 701/29
(58) Field of Search ................... 340/5.22, 825.69, 340/825.72, 825.73, 825.74, 825.76, 426, 539, 5.65, 5.64, 5.31; 455/101, 151.1, 151.2, 151.4, 152.1; 307/10.5; 701/29, 32

(56) References Cited

U.S. PATENT DOCUMENTS 5,773,803 A * 6/1998 Fukuda ....................... 234/375

* cited by examiner

Primary Examiner—Michael Horabik
Assistant Examiner—M Shimizu

(57) ABSTRACT

A vehicle security system 10 including a controller 12 which allows a vehicle to be operated only with an authorized key 36. The system 10 includes a diagnostic tool 32 which cooperates with the controller 12 to allow a user to selectively and securely program an unlimited number of keys 36 which allow the vehicle to be operated.

17 Claims, 3 Drawing Sheets

VEHICLE SECURITY SYSTEM HAVING UNLIMITED KEY PROGRAMMING

FIELD OF THE INVENTION

The present invention generally relates to a vehicle security system and more particularly, to a vehicle security system which allows a user to selectively and securely program an unlimited number of keys for securely operating one or more vehicles.

BACKGROUND OF THE INVENTION

Vehicle security systems are generally used to deter and/or prevent the unauthorized use of a vehicle. One type of vehicle security system includes electronic circuitry which is housed and/or mounted upon an ignition key for the vehicle. The electronic circuitry typically includes a transponder that emits a signal corresponding to one or more unique identification and/or encrypted security codes. Particularly when the ignition switch is moved to the "RUN" or "RUN/START" position, the transponder is energized and transmits the coded signal. A controller contained and/or mounted within the vehicle receives the signal and compares the unique identification and/or encrypted security codes to one or more stored values, and allows the vehicle to start only if the one or more unique identification and/or encrypted security codes match any one or more of the stored values.

One drawback associated with this type of vehicle security system is that, due to memory constraints within the control modules, only a finite number of keys (e.g., 8 or 16) are allowed to be programmed within each system. Thus, owners of these vehicles are limited to a small number of keys that can be made/used per vehicle (e.g., 8 or 16). This restriction is especially undesirable and troublesome in situations where multiple users or operators are to utilize the same vehicle or group of vehicles (e.g., police cars, rental cars, limousines, taxis, and other fleet or service vehicles).

There is therefore a need for a vehicle security system which overcomes the drawbacks of the prior systems and assemblies and which allows an unlimited number of keys to be used to securely operate a vehicle or group of vehicles.

SUMMARY OF THE INVENTION

It is a primary object of the present invention to provide a vehicle security system which overcomes at least some if not all of the previously delineated disadvantages of prior assemblies and/or systems.

It is a second object of the present invention to provide a vehicle security system which allows for an unlimited number of keys to securely operate a vehicle or group of vehicles.

It is a third object of the present invention to provide a vehicle security system which utilizes a plurality of keys which each include a transponder holding a programmable security code and an identification code, which are selectively read by a controller that allows the vehicle to be operated only if the security code matches a programmable stored value.

According to a first aspect of the present invention, a security system is provided for use in combination with a vehicle having a propulsion system which is selectively activated by use of a switch. The security system includes a key which is adapted to fit within the switch and to actuate the switch; an electronic assembly which is mounted upon the key and which selectively stores and transmits a first code and a second code; and a controller which is connected to the switch and to the propulsion system, the controller having a plurality of stored first values and a stored second value which is selectively programmable, the controller being effective to receive the first code and the second code, and being further selectively switchable between a first mode in which the controller is effective to activate the propulsion system only if the first code matches a unique one of the plurality of stored first values and the second code matches the stored second value, and a second mode in which the controller is effective to activate the propulsion system only if the second-code matches the second value.

Further objects, features, and advantages of the present invention will become apparent from a consideration of the following description and claims, when taken in conjunction with the accompanying drawings.

DETAILED DESCRIPTION OF THE PREFERRED EMBODIMENT OF THE INVENTION

Figure 1:
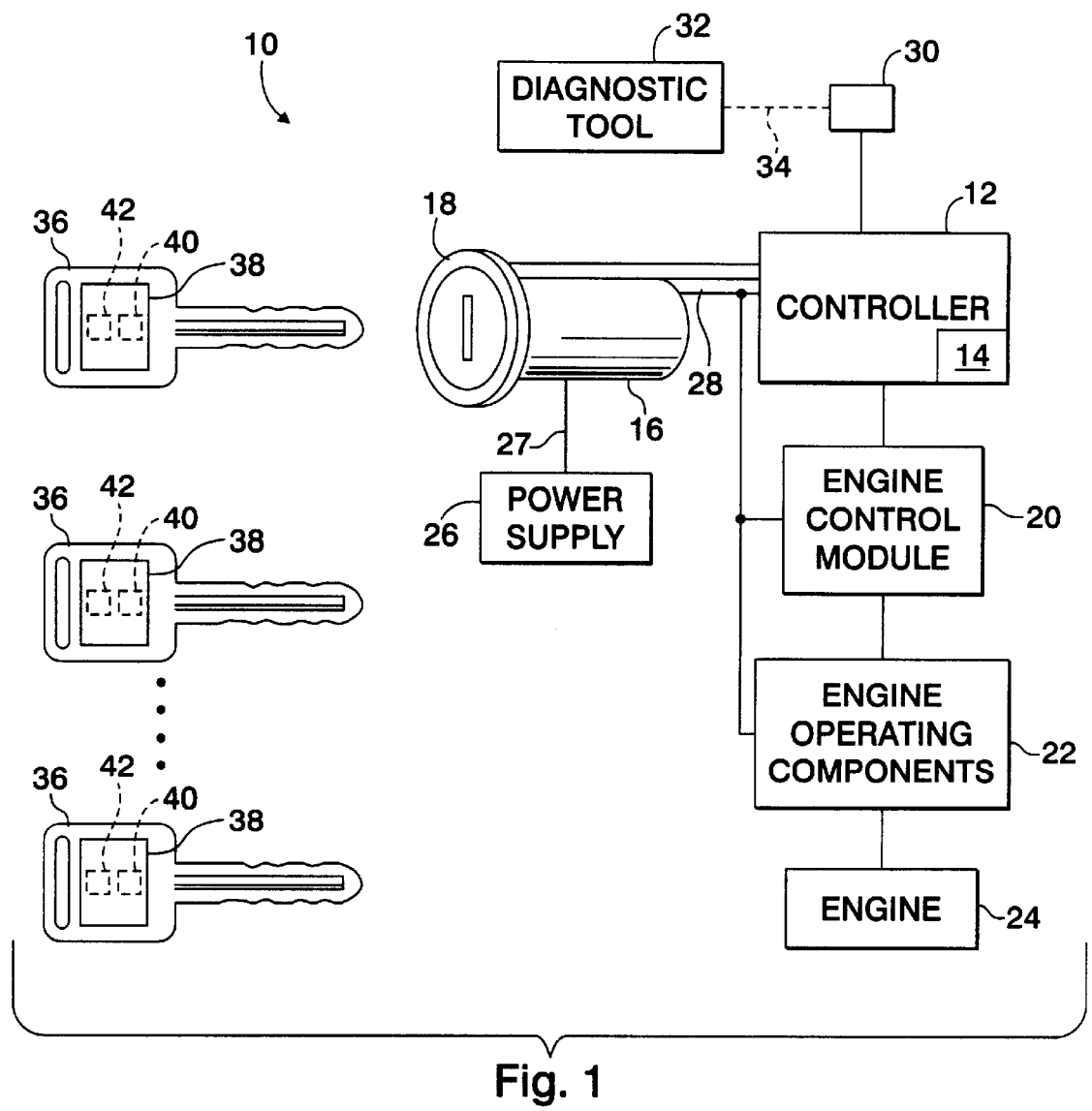
FIG. 1 is a block diagram of a vehicle security system which is made in accordance with the teachings of the preferred embodiment of the invention.

Referring now to FIG. 1 there is shown a vehicle security system or assembly 10 made in accordance with the teachings of the preferred embodiment of the invention, and operatively deployed upon and/or within a vehicle having a conventional engine, motor or propulsion controller or control module 20, engine operating or activating components 22, a conventional engine, motor or other propulsion system 24, and a selectively positionable ignition switch or lock 16. System 10 includes a control module or controller 12 which is typically securely mounted in a convenient location within the passenger compartment of the vehicle, such as underneath the vehicle dashboard. The control unit 12, controller 20, and engine operating components 22 are connected to and receive electrical power from an electrical power bus or wire 28 which is connected to ignition switch 16 and which receives a constant supply of power from a conventional power supply or battery 26. System 10 further includes a diagnostic tool, device or assembly 32, an antenna 18, and a plurality of keys 36 each of which includes a conventional electronic storage assembly, circuit or transponder 38.

Engine controller 20 is a conventional engine control module which selectively activates and controls the operation of engine 24 by use of engine operating components 22. Particularly, engine controller 20 receives information, signals and other data from ignition switch 16, controller 12 and other vehicle sensors and controls (not shown) and based upon the received signals and data, generates signals to engine operating components 22, thereby activating and/or controlling the operation of engine 24. In the preferred embodiment of the invention, engine operating components 22 comprise conventional electrically controlled components such as a fuel pump, fuel injectors, and ignition components.

Ignition lock or switch 16 is a conventional selectively positionable ignition switch which is adapted to receive one or more keys 36. Switch 16 includes several selectable positions (e.g., "OFF", "RUN", "RUN/START" and "ACCESSORY" positions) which correspond to different operating conditions of the vehicle. Ignition switch 16 is electrically and communicatively coupled to controller 12, and to power supply 26 by use of a power wire or bus 27.

In the preferred embodiment of the present invention, controller 12 is a conventional and commercially available microprocessor-based system, including one or more microprocessors or integrated circuits acting under stored program control. Controller 12 includes a conventional memory unit 14 which includes both permanent and temporary memory and which stores at least part of the operating software which directs the operation of system 10. Moreover, memory 14 is also adapted to selectively store other types of data or information, including information associated with the operation of the preferred embodiment of the invention, such as identification codes and security codes and predetermined "delay" or time periods.

Control unit 12 is electrically and communicatively coupled to antenna 18 which transmits and receives electromagnetic signals 36 to and from memory devices or transponders 38. Particularly, as discussed more fully and completely below, the selective positioning of a key 36 within switch 16 causes controller 12 to generate of one or more command and control signals through antenna 18. Upon receiving the generated signals, transponder 38 becomes energized and transmits one or more signals or codes to control unit 12.

Controller 12 further includes a terminal 30 which is adapted to selectively connect diagnostic tool 32 to controller 12. Diagnostic tool 32 is a conventional diagnostic electronic assembly including a controller or microprocessor, an input device (e.g., a keyboard), and a display (e.g., a video monitor or screen). Diagnostic tool 32 is selectively connectable to terminal 30 by use of a communications bus, path or cable 34.

In the preferred embodiment of the invention, lock operation devices or keys 36 are conventional keys which can be cut in a desired or predetermined pattern to fit within and operate lock or switch 16. When a user or operator desires to use the same keys 36 throughout an entire group or fleet of vehicles, each key 36 and lock 16 will have a substantially identical pattern. Keys 36 further include a memory or storage device or assembly 38 which, in the preferred embodiment of the invention, includes a conventional transponder. Particularly, assembly 38 is adapted to selectively transmit a response code automatically upon receipt of a specified electromagnetic signal or code. In one non-limiting embodiment, a high energy frequency signal from 120 kHz–140 kHz is used to activate the transponder 38. Additionally, the signal used to activate the transponder can be modulated in order to send a data signal to the transponder 38. The transponder is adapted to utilize this data signal to store an electronic security code 42, or other data. In the preferred embodiment of the invention, transponder 38 includes a fixed serial number or identification code 40. Each key 36 has a unique or different identification code 40, which is unchangeable after manufacture and can be used to distinguish one key from another key. In the preferred embodiment of the invention, code 42 comprises a selectively programmable and encrypted security code. Each code 42 is set to a vehicle-specific default value which can be changed or modified when system 10 is set to unlimited key mode as described more fully and completely below.

Transponder 38 is adapted to receive a "power" signal and a randomly selected data stream (e.g., 5 bytes) from antenna 18 when key 36 is inserted into lock 16 and turned to the "RUN" or "RUN/START" positions. Upon receipt of these signals, transponder 38 energizes and transmits a signal having a value corresponding to stored codes 40 and corresponding to code 42 encrypted with the randomly selected data stream. Antenna 18 receives the transmitted codes 40, 42 and, in the preferred embodiment of the invention, determines whether vehicle access is authorized. In the preferred embodiment, controller 12 typically uses only security code 42 to determine whether the vehicle should be activated. As discussed more fully and completely below, identification code 40 is used by controller 12 to distinguish between keys in the key programming procedure.

In operation, system 10 may be selectively set in an "unlimited key" mode or in a "normal key" mode. As described more fully and completely below, when the system 10 is in unlimited key mode, a user can choose or select a desired security code and can program the chosen code into the control module 12. This chosen code is used to derive security code 42. The user may then program an unlimited number of keys with the derived security code 42, thereby allowing an unlimited number of keys 36 to operate the vehicle or group of vehicles. In normal key mode, each vehicle has a unique security code which is programmed into each key as code 42. The controller 12 also stores the identification codes 40 of a finite number of keys. Both code 40 and code 42 must match in order for the vehicle to start. Hence, in normal key mode, only a finite number of keys can be programmed to operate the vehicle or vehicles.

Figure 2:
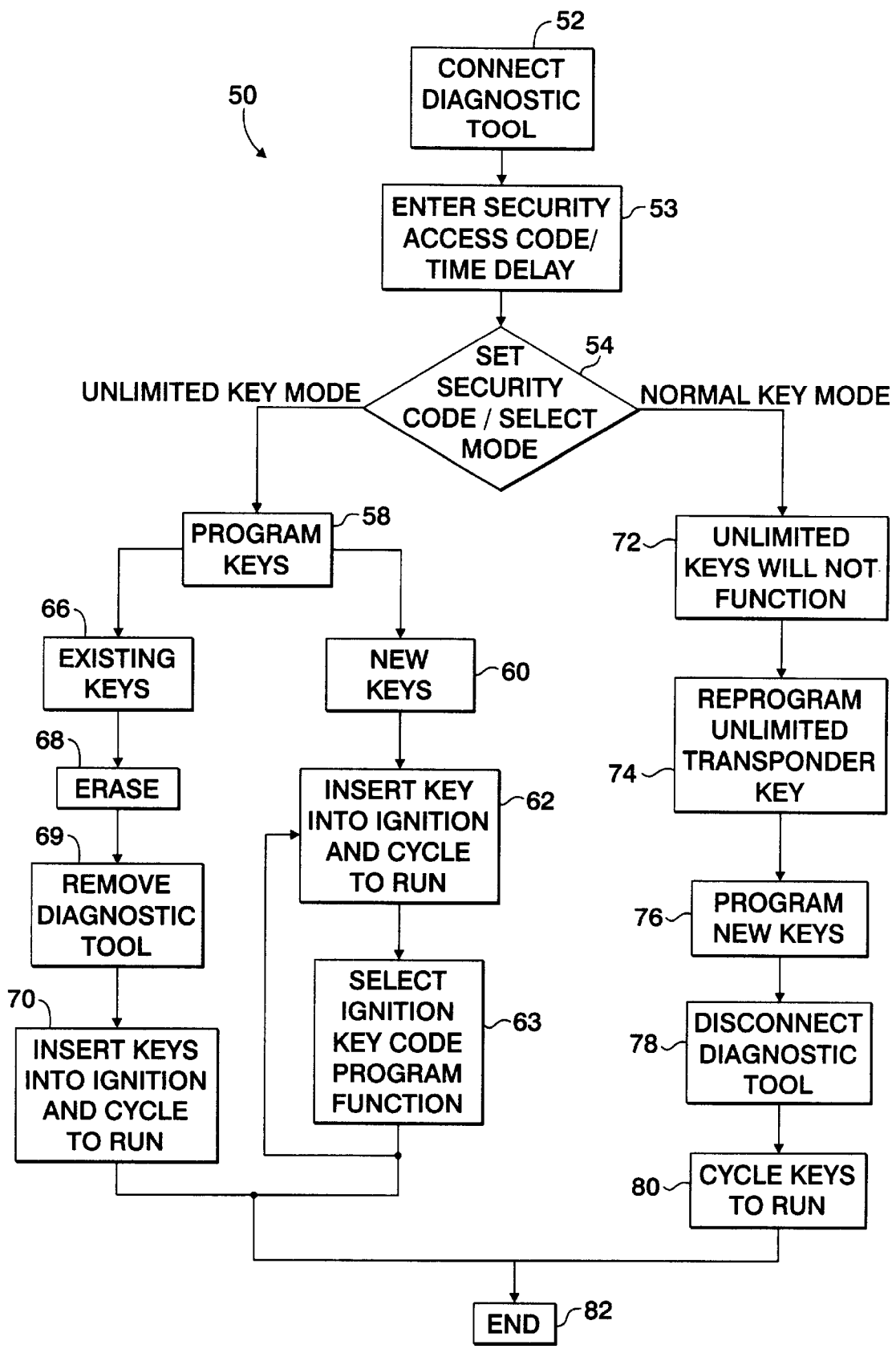
FIG. 2 is a block diagram illustrating the operational functionality of the vehicle security system shown in FIG. 1.

To more fully understand the operational functionality of the preferred embodiment of system 10, reference is now made to the operational flow diagram or "flow chart" 50 of FIG. 2. As shown in functional block or step 52, the diagnostic tool 32 is selectively connected to terminal 30 of controller 12 in order to select the mode or state of system 10. In the preferred embodiment of the invention, a security time delay or a unique security access code must be entered into diagnostic tool 32 prior to selecting between unlimited key mode and normal key mode, as illustrated by functional block or step 53. In this manner, system 10 ensures that only an authorized individual (e.g., a dealer or service technician) can program the system 10, thereby reducing the risk of an unauthorized individual accessing the system by use of a diagnostic tool or device. In one non-limiting embodiment, controller 12 enters into a delay period of several minutes to an hour, thereby making the unauthorized use of a diagnostic tool an impracticable or infeasible means for a thief to steal a vehicle. Once the access code is entered and/or the delay period expires, a user may selectively set a security code, and enable or disable unlimited key mode, as illustrated by functional block or step 54.

In functional block or step 54, diagnostic tool 32 allows a user to set or enter an unlimited key security code. In the preferred embodiment of the invention, the unlimited key security code comprises a "four-digit" number or value with valid digits or values including numbers "0–9" and letters "A–F". In cases where the same keys are desired to start multiple vehicles in the fleet or group, the same security code can be used or programmed into multiple vehicles.

Once the security code has been programmed, a user selects between unlimited key mode and normal key mode by use of diagnostic tool 32. If the user enables unlimited key mode, controller 12 proceeds to functional block or step 58. The user or operator may then program any keys which are desired to be used with the system 10, as illustrated by functional block or step 58.

The user may either reprogram the existing keys which were supplied with the vehicle, or to program new keys. If the existing keys are reprogrammed, the existing keys must again be reprogrammed when unlimited key mode is disabled or "turned off". If the unlimited keys are set aside, they will again operate the vehicle after unlimited key mode is disabled or "turned off". That is, memory 14 will continue to store the original several "normal" key identification codes, and will only use the unlimited key security code when in unlimited key mode. When unlimited key mode is disabled, controller 12 will again compare the codes 40, 42 to the original stored values to determine whether there is a match.

If a user desires to reprogram the existing keys, as shown in functional block or step 66, the user must first erase the existing keys. To erase the existing keys, a user will select an "ignition key code erase" function which is displayed on the diagnostic tool 32. By executing this command, the diagnostic tool erases security code 42 on transponder 38, as shown in functional block or step 68. The user may repeat this procedure for each existing key that the user desires to use in unlimited key mode.

After the erase command is executed, the diagnostic tool is removed or disconnected from the controller in step 69, and the keys may be reprogrammed as illustrated in functional block or step 70. In the preferred embodiment of the invention, a user must disconnect the diagnostic tool 32, and turn the ignition to the "OFF" position for a predetermined period of time (e.g., at least ten seconds). After the predetermined period of time (e.g., ten seconds) has elapsed, two separate keys must be cycled to the "RUN" or "RUN/START" position and held in the "RUN" or "RUN/START" position for at least three seconds. As a security precaution, controller 12 reads identification code 40 to ensure that two different keys are being cycled, and will allow the vehicle to start only after such a determination is made. When each key is cycled, controller 12 transmits a signal to transponder 38, effective to program code 42 to a value derived from the unlimited security code. Setting code 42 to a value different from (i.e., derived from) the unlimited security code is a precaution against an individual programming unlimited keys by obtaining a copy of the unlimited security key code. After the second key is cycled, the vehicle will start by use of either key, and the key programming strategy ends, as illustrated in functional block or step 82.

To program "new" or unprogrammed keys without erasing the existing keys, an unprogrammed key must be inserted into the ignition lock, as illustrated in functional block or step 60. Without disconnecting the diagnostic tool 32, the ignition switch 16 must be turned to the "OFF" position for a predetermined period of time (e.g., for up to ten seconds). The ignition switch 16 is then turned to the "RUN" or "RUN/START" position, as illustrated in functional block or step 62. When the key(s) are in the "RUN" or "RUN/START" position, a user selects an "ignition key code program" function which is displayed on diagnostic tool 32, as shown in functional block or step 63. When selected, the "ignition key code program" function causes controller 12 to transmit a signal to transponder 38, effective to derive the program security code 42 from the chosen unlimited key security code. The foregoing procedure may be repeated for any number of keys, thereby allowing a user to program an unlimited number of keys to the chosen unlimited key security code. After completing the new key programming, the diagnostic tool 32 must be disconnected from terminal 30 and the ignition switch 18 must be turned to the "OFF" position for a predetermined period of time (e.g., at least 10 seconds). The vehicle will then start with any of the programmed keys.

It should be appreciated that a user may program an entire group or fleet of vehicles to the same security code, thereby allowing each of the keys to be used interchangeably to start any of the vehicles. This provides a significant advantage over prior systems. Particularly, unlike prior systems, once a key has been programmed into one vehicle, the same key can be used to start the entire fleet or group of vehicles without having to program the key into each vehicle. Hence, the unlimited security key code function of the present invention substantially and desirably decreases the amount of time and memory required to program keys into a fleet or group of vehicles.

In order to disable unlimited key mode, or to enter normal key mode, a user enters the security access code and selects to disable unlimited key mode on the diagnostic tool 32 in functional block or step 54. Once unlimited key mode has been disabled, none of the "unlimited keys" (i.e., the keys that were programmed with the unlimited security key code) will function, as shown in functional block or step 72. Rather, controller 12 will now compare the security key code 42 to a "normal" key code it has stored within memory 14 and will compare identification code 40 to several values stored within memory 14. If the codes 40, 42 do not both match the stored values (e.g., the stored security key code and one of the identification codes), the vehicle engine 24 will not be activated.

When unlimited key mode is disabled, a user reprograms the unlimited security key code in functional block or step 74. Particularly, a new four digit number is programmed into controller 12. Performing this step assures that future vehicle users cannot ascertain the unlimited security key code which was assigned to a fleet or group of vehicles.

In functional block or step 76, new keys are programmed into controller 12. If the original keys were not erased and reprogrammed in unlimited key mode, the original keys will still start the vehicle. To program new keys, a user disconnects the diagnostic tester, as shown in functional block or step 78. A user then turns switch 16 to the "OFF" position for a predetermined period of time (e.g., at least 10 seconds). In functional block or step 80, a user will then cycle two different ignition keys to the "RUN" or "RUN/START" position, leaving them in "RUN" or "RUN/START" for a predetermined period of time so that the new security code may be programmed into the transponder 38 as code 42 (e.g., at least 3 seconds). As a security precaution, controller 12 reads identification code 40 to ensure that two different keys are being cycled, and will allow the vehicle to start only after making such a determination. When each key is cycled, controller 12 transmits a signal to transponder 38, effective to program each code 42 to equal the "normal" security key code stored within memory 14. After the second key is cycled, controller 12 allows the vehicle to start by use of either key, and the key programming strategy ends, as illustrated in functional block or step 82.

Figure 3:
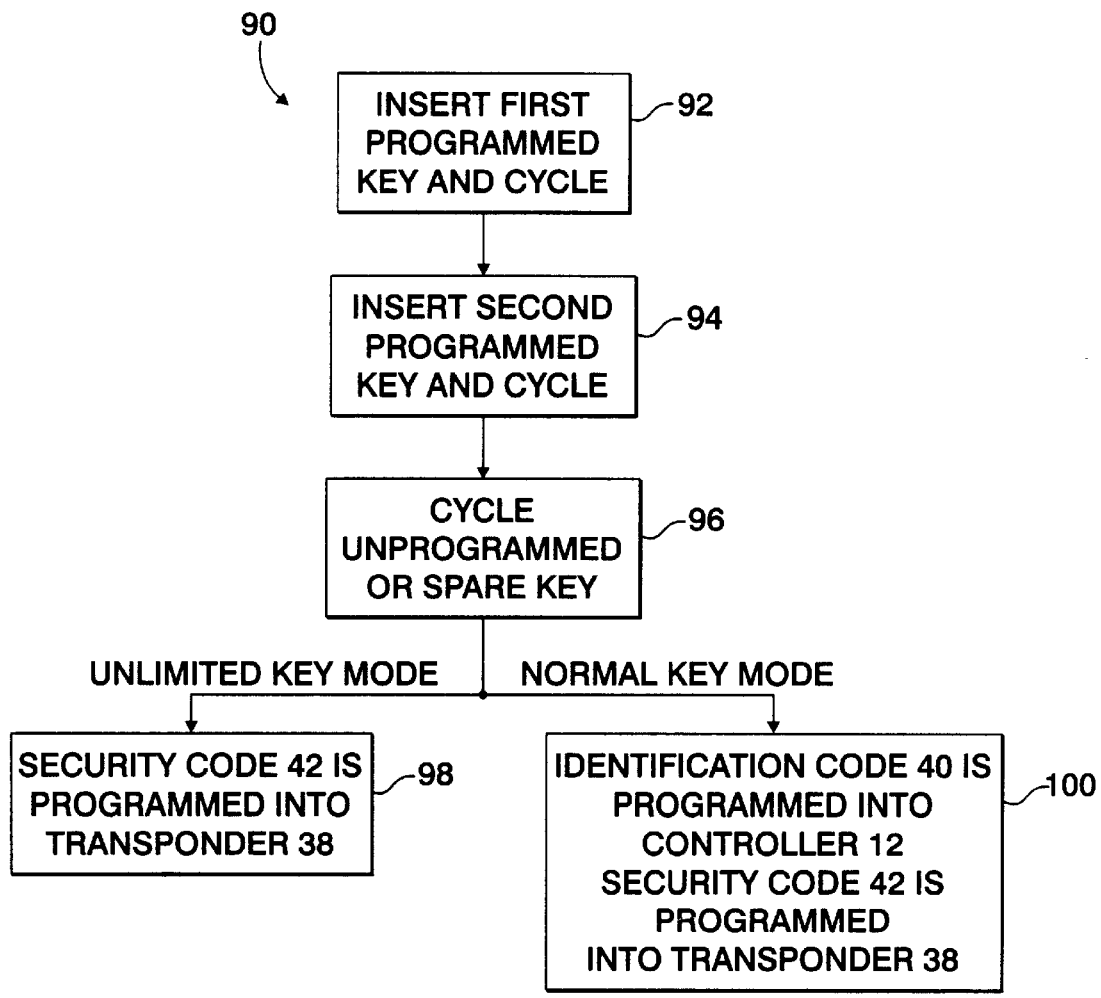
FIG. 3 is a block diagram illustrating the operation of the spare key programming function of the vehicle security system shown in FIG. 1.

Referring now to FIG. 3, there is shown a block or flow diagram 90, illustrating the "spare key" programming functionality of the preferred embodiment of the present invention. As shown in FIG. 3, system 10 allows users to program spare keys without the use of diagnostic tool 32.

As shown in functional block or step 92, a user must insert a first valid programmed key to ignition switch 16 and position switch 16 in the "RUN" or "RUN/START" position for a predetermined period of time (e.g., two seconds), as shown in functional block or step 92. The first key is then removed from the ignition switch 16. Within ten seconds, a user must then insert a second valid programmed key into switch 16 and turn switch 16 to the "RUN" position for a predetermined period of time (e.g., two seconds), as shown in functional block or step 94. The second key is then removed from the ignition switch 16. As a security precaution, controller 12 reads identification codes 40 of the first and second key to ensure that two different keys are cycled, and will allow the spare key to be programmed only after making such a determination. Within twenty seconds of removing the second key, a user must then insert the unprogrammed or spare key into switch 16 and turn switch 16 to the "RUN" or "RUN/START" position for a predetermined period of time (e.g., two seconds). If the system 10 is in unlimited key mode when the spare key is cycled, controller 12 transmits a signal to transponder 38, effective to program code 42 into transponder 38 by use of the unlimited security code, as illustrated by functional block or step 98. If the system 10 is in normal key mode when the spare key is cycled, the identification code 40 of the spare key is programmed into controller 12 and the security code 42 is programmed into transponder 38, as illustrated in functional block or step 100. It should be appreciated that spare keys may also be programmed by use of the diagnostic tool 32 in the previously described manner.

It should be understood that this invention is not limited to the exact construction or embodiments listed and described but that various changes may be made without departing from the spirit and scope of the invention.

What is claimed is:

1. A security system for use in combination with a vehicle having a propulsion system which is selectively activated by use of a switch, said security system comprising:

a key which is adapted to fit within said switch and to actuate said switch;

an electronic assembly which is mounted upon said key and which selectively stores and transmits a first code and a second code; and a controller which is connected to said switch and to said propulsion system, said controller having a plurality of stored first values and a stored second value which is selectively programmable, said controller being effective to receive said first code and said second code, and being further selectively switchable between a first mode in which said controller is effective to activate said propulsion system only if said first code matches a unique one of said plurality of stored first values and said second code matches said stored second value, and a second mode in which said controller is effective to activate said propulsion system only if said second code matches said second value.

2. The security system of claim 1 further comprising:

a diagnostic assembly which is selectively coupled to said control unit and which is effective to selectively program said second value, and to cause said controller to switch between said first mode and said second mode.

3. The security system of claim 1 wherein said electronic assembly comprises a transponder.

4. The security system of claim 1 further comprising an antenna which is disposed in relative close proximity to said ignition switch, said antenna being communicatively coupled to said controller and being effective to receive said first code and said second code from said electronic assembly.

5. The security system of claim 1 further comprising:

a plurality of second keys which are adapted to fit within said switch and to allow said switch to move from said first position to said second position;

a plurality of second electronic assemblies, each of which is mounted upon a unique one of said plurality of second keys and each of which selectively stores and transmits a plurality of third codes and a plurality of fourth codes; and wherein said controller is further effective to selectively program each of said plurality of fourth codes to match said second value, thereby allowing each of said plurality of second keys to activate said propulsion system when said controller is in said second mode.

6. A security system for use in combination with a vehicle having an ignition switch, said security system comprising:

a key which is selectively inserted into said ignition switch and which includes an identification code and a programmable security code; and a controller which is selectively operable in an unlimited key mode in which said controller is effective to read said security code and to allow said vehicle to be operated based upon said security code, said controller being further selectively operable in a normal key mode in which said controller is effective to read said identification code and said security code and to allow said vehicle to be operated based upon said identification code and said security code.

7. The security system of claim 6 wherein said identification code and said security code are stored within a transponder which is operatively mounted on said key.

8. The security system of claim 7 wherein said controller is effective to compare said security code to a first stored value and to allow said vehicle to be operated only if said security code matches said first stored value when said controller is operating in said unlimited key mode.

9. The security system of claim 8 wherein said controller is effective to compare said security code to a second stored value and to compare said identification code to a plurality of third stored values, and to allow said vehicle to be operated only if said security code matches said first stored value and said identification code matches a unique one of said plurality of third stored values when said controller is operating in said normal key mode.

10. The security system of claim 9 further comprising:

a diagnostic assembly which is selectively and communicatively coupled to said controller, and which is effective to selectively switch said controller between said normal key mode and said unlimited key mode, and which is effective to selectively program said first value.

11. The security system of claim 10 wherein said controller is further effective to selectively program said security code to match said first value when said controller is operating in said unlimited key mode.

12. The security system of claim 11 further comprising a plurality of second keys having a plurality of second security codes, and wherein said controller is further effective to selectively program each of said plurality of second security codes to match said first value, thereby allowing each of said plurality of second keys to operate said vehicle when said controller is operating in said unlimited key mode.

13. The security system of claim 12 wherein said plurality of second keys comprises an unlimited number of second keys.

14. A method for providing a security system for a vehicle including an ignition switch, said method comprising the steps of:

providing a controller which stores an electronic security code and which is effective to allow said vehicle to be operated only by use of a key which contains said electronic security code; and causing said controller to selectively operate in an unlimited key mode in which said controller is effective to selectively program a plurality of keys to contain said electronic security code only after a first key containing said electronic security code and a first electronic identification code and a second key containing said electronic security code and a second electronic identification code which is different than said first electronic identification code have been inserted into said ignition switch within a predetermined period of time, thereby allowing said plurality of keys to operate said vehicle, wherein said plurality of keys comprises an unlimited number of keys.

15. The method of claim 14 wherein said controller further stores a plurality of electronic identification codes, said method further comprising the steps of:

causing said controller to selectively operate in a normal key mode in which said controller is effective to allow said vehicle to be operated only by use of a key which contains a unique one of said electronic identification codes.

16. The method of claim 15 further comprising the steps of:

providing a diagnostic assembly having a security access code;

selectively connecting said diagnostic assembly to said controller;

entering said security access code; and utilizing said diagnostic assembly to cause said controller to selectively operate in said unlimited key mode and said normal key mode.

17. The method of claim 16 wherein said security system is further adapted for use in combination with at least one second vehicle, said method further comprising the steps of:

providing at least one second controller; and selectively programming said electronic security code within said at least one second controller by use of said diagnostic assembly, effective to cause said at least one second controller to allow said at least one second vehicle to be operated only by use of a key which contains said electronic security code.

* * * * *